Figure 1:
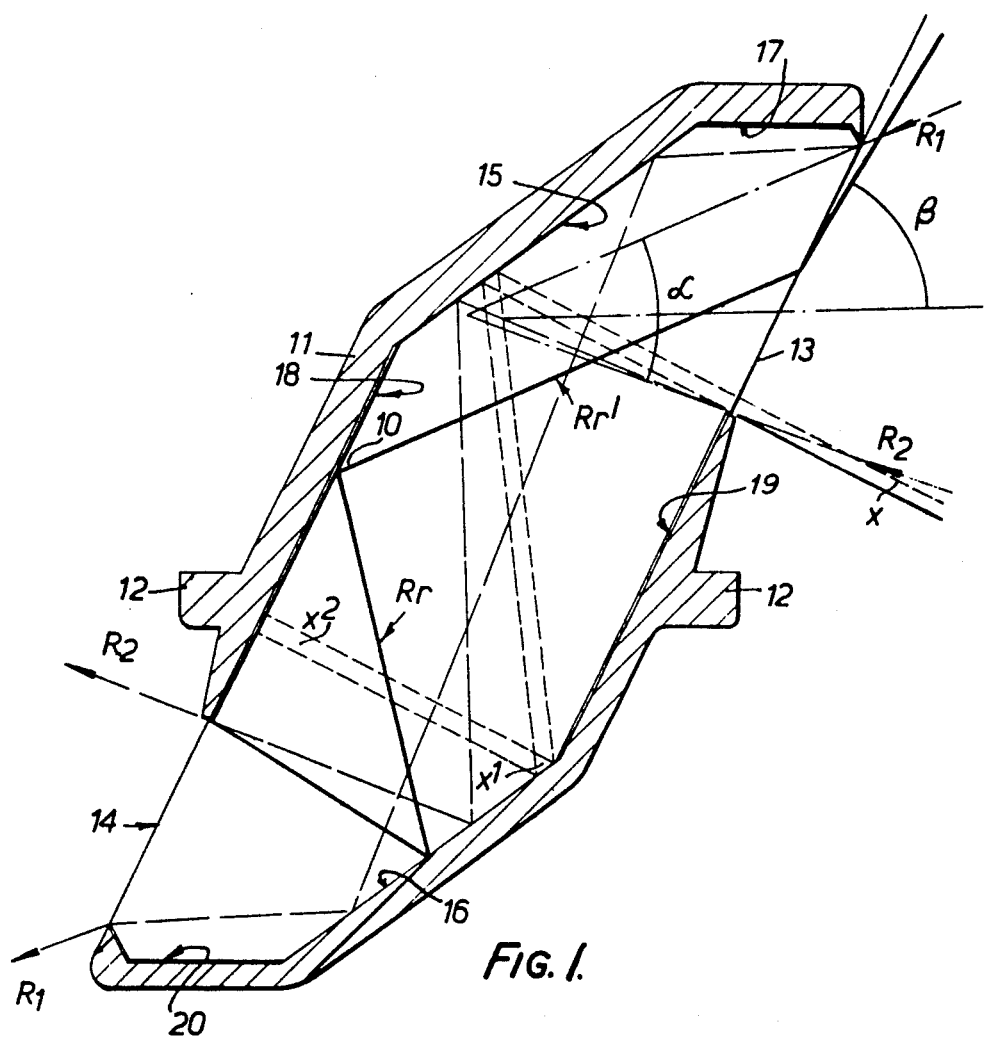

United States Patent

[11] 3,619,040

| [72] | Inventor | William Thomas Ricketts<br>Kent, England |
|---|---|---|
| [21] | Appl. No. | 856,546 |
| [22] | Filed | Sept. 10, 1969 |
| [45] | Patented | Nov. 9, 1971 |
| [73] | Assignee | David Mark Cowan and Stanley Phillip Cowan, trading in partnership as the Helio Mirror Company |

[54] PRISM PERISCOPE
2 Claims, 2 Drawing Figs.

| [52] | U.S. Cl. | 350/286, 350/301 |
|---|---|---|
| [51] | Int. Cl. | G02b 5/04, G02b 23/08 |
| [50] | Field of Search | 350/286, 287, 25, 26, 52, 301, 302 |

[56] References Cited

UNITED STATES PATENTS

| 840,378 | 1/1907 | Salow | 350/287 |
|---|---|---|---|
| 1,672,155 | 6/1928 | Gordon | 350/25 UX |
| 2,130,006 | 9/1938 | Gundlach | 350/287 X |
| 2,757,575 | 8/1956 | Kovach | 350/286 |
| 2,896,498 | 7/1959 | Brandon | 350/286 |
| 3,001,015 | 9/1961 | Weiss | 350/286 X |

FOREIGN PATENTS

| 143,772 | 11/1935 | Austria | 350/301 |
|---|---|---|---|
| 1,053,650 | 9/1953 | France | 350/302 |

*Primary Examiner*—David H. Rubin
*Attorney*—Laurence E. Laubscher

ABSTRACT: A periscope prism or a periscope installation including such a prism in which in order to avoid reflection from said prism back to the object under observation, the entry surface, any internally reflecting surfaces and the exit surface of said prism are arranged to be at angles other than right angles to the path of the light incident thereon.

William T. Ricketts
INVENTOR

William T. Rickets
INVENTOR

BY Lawrence C. Laubscher
ATTORNEY

PRISM PERISCOPE

This invention relates to optical apparatus and more specifically to prismatic periscopes, such as are employed on fighting vehicles. In addition to the normal requirements of a prismatic periscope, it may be required that the periscope should not reflect, even to a low degree, light incident upon the periscope, over a working angular range of incidence. For example, reflection from the periscope of a fighting vehicle of a strong light source such as the sun or a searchlight, might be revealing of the position of the vehicle. The present invention is concerned with a prismatic periscope in which unwanted reflections of this kind are substantially reduced or eliminated within a working range. The invention includes a periscope prism comprising a body of transparent material having a planar entry surface, at least one planar internally reflecting surface and a planar exit surface, said prism having an entry or acceptance angle ($\alpha$) defined by the limiting rays which can pass into said entry surface, through said body and emerge from said exit surface, the median to said entry angle making an angle (B) with said entry surface, said entry surface being shaped so that said angle is other than a right angle, beams of light incident on said reflecting surface and derived from light incident on said entry surface within said entry angle making an angle with said reflecting surface, said reflecting surface being so shaped that said angle is other than a right angle, and beams of light incident on said exit surface and derived from light incident on said entry surface within said entry angle after reflection by said reflecting surface making an angle with said exit surface, said exit surface being so shaped that said angle is other than a right angle.

The invention also includes a periscope installation comprising a prism wherein the entry surface is normally inclined forwardly to the vertical by an angle of from 10° to 40°.

Figure 2:
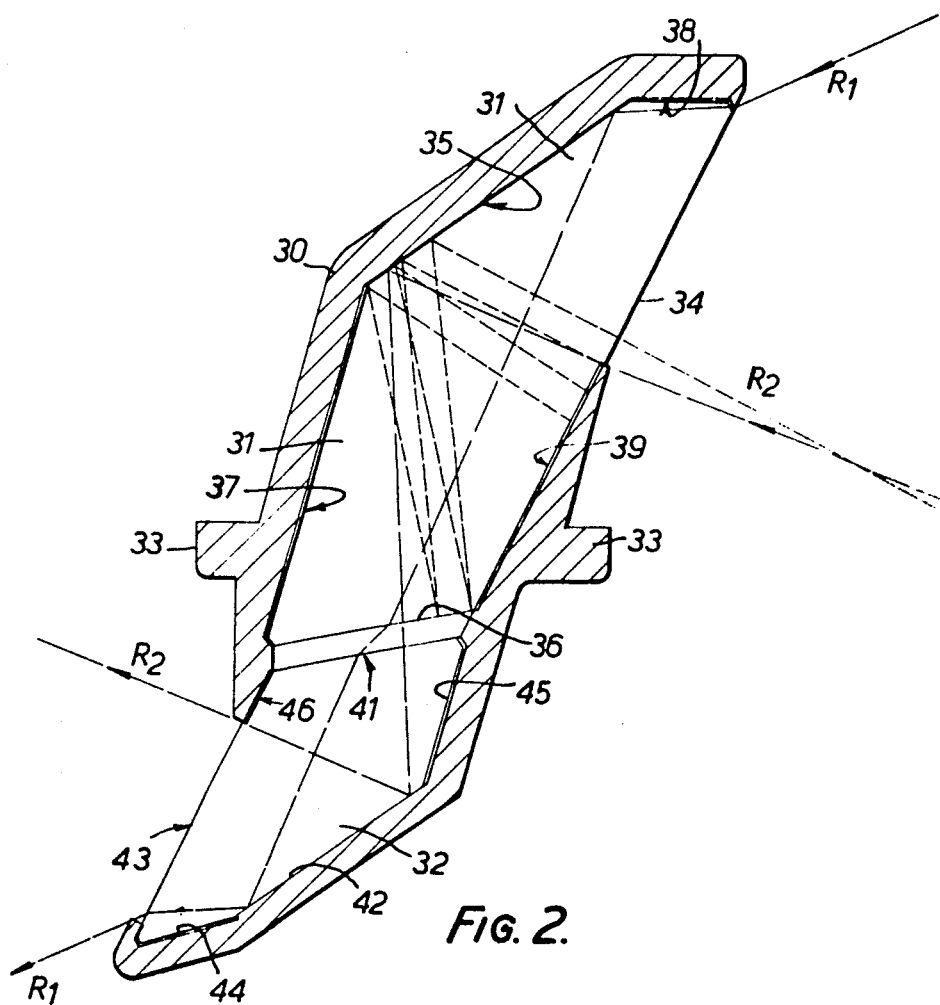

Features and advantages of the invention will appear from the following description of embodiments thereof, given by way of example, in conjunction with the accompanying drawings, in which:

FIG. 1 is a vertical sectional view through a prismatic periscope using a single optical element, and FIG. 2 is a vertical section through a periscope using two optical elements.

The periscope shown in FIG. 1 comprises a prismatic optical element 10 which is mounted in a protective casing shown partly diagrammatically at 11. The casing includes a flange 12 by which the periscope can be mounted in an opening in a support structure, such as an opening in the body of a fighting vehicle.

The casing 11 exposes a first surface 13 of the prism, which for convenience can be identified as the entry surface, and a surface 14, which similarly can be identified as the exit surface. Light entering surface 13 is internally reflected within the element 10, and emerges through surface 14, where a viewer is presumed to be located. Accordingly, the prism is internally reflecting, and therefore optically finished at surfaces 15 and 16; at the remaining surfaces 17, 18, 19 and 20 are not used for internal reflection within the prism and need not therefore be optically finished and it is advantageous if they are made light absorbing.

It will be seen that the entry surface 13 is parallel to the exit surface 14 and that the internally reflective surfaces 15 and 16 are also parallel. This is a convenient, though not essential, arrangement.

The periscope will accept light incident upon surface 13 lying between two limiting angles of incidence corresponding to the rays R1 and R2, so that the angle ($\alpha$) between the rays R1 and R2 will be the angle of acceptance of the periscope. The corresponding emergent limiting rays R1 and R2 will have the same angle between them. For a reason which will become apparent hereinafter, it is desirable that the extent of surface 14 should not be substantially greater than is necessary to accommodate the rays R1 and R2 limited by the extent of surface 13, and vice versa. Thus, the limiting ray R1 which can just emerge from the surface 14, can just enter the surface 13 and similarly the ray R2 which can just emerge from surface 14, can just enter the surface 13. For the same acceptance angle, either surface 13 or 14 could be of somewhat greater linear extent but this is undesirable. It is a feature of the present invention that the front surface 13 of the element of the periscope is, in use, arranged at an angle to the vertical. If, for example, the periscope has a front surface which is vertical there may be from this surface reflection of a powerful light source, such as the sun or a searchlight, at angles which permit them to be seen by distant observers, and which may therefore be revealing of the position of the vehicle on which the periscope is mounted. For example, reflections of a searchlight at ground level may be visible to a distant observer at ground level and sun reflections may also be visible to ground observers. Since motion of the vehicle may cause substantial changes of attitude of the vehicle and hence the vertical angle of the front surface of the periscope, there will be a corresponding increase of vertical angle through which unwanted reflections of this kind may occur.

By arranging the front surface of the prismatic element at a downward angle, as shown in Figure 1, reflections of a light source at ground level will be directed downwardly and sun reflections will be directed even more sharply downward, causing them to strike the ground and be absorbed, with lesser likelihood of being seen by a ground observer. By so much as the attitude of the vehicle may cause the front surface to approach the vertical in use, so the danger of visible reflections of this kind is increased, so that the angle of inclination chosen will depend upon the nature of the vehicle and the service to which it is to be subjected, but a convenient range of inclinations is from 10° to 40°. This angle will be the angle assumed by the front surface of the periscope when installed in a vehicle standing on level ground. The angle of the front face of the periscope for the entry surface is, however, largely inherent in the design of the periscope itself, because in use it will usually occur that with the vehicle on level ground the limiting rays R1 and R2 defining the acceptance angle of the periscope will be inclined equally to and respectively above and below the horizontal plane. Hence the median of the acceptance angle of the prism can be considered as the horizontal plane and, in the sectional view of FIG. 1, the line perpendicular to this median can be taken as a vertical datum line of the periscope, to which the front surface of the prism will be inclined.

We have discovered that significant reflections can be obtained not only from the front surface, such as 13, of a periscope prism, but also from other internally reflecting surfaces of the element. For example, there will be a substantial degree of reflection from the inner side of the surface 14 of the prism but with the construction according to the invention, any rays lying within the range defined by rays R1 and R2, and reflected from the inner side of surface 14, are directed within the body of the prism element so as to be absorbed within the element, by falling upon the absorbing internal surfaces of the prism, and will not therefore emerge from the front surface.

For example, the ray R2 will strike the inner glass-to-air boundary surface 14 as indicated, and a proportion of the light will be reflected along the path Rr and after reflection at surface 16 will strike the surface 18, and will there be substantially absorbed Were it not for this absorption, the ray might continue on the path Rr', and emerge from the surface 13 of the prism.

FIG. 1 also shows the path of a pencil of rays near the path of ray R2. If a pencil enters the front surface 13 of the prism along the path indicated at $x$, it will strike the reflecting surface 15, be totally reflected internally on to the surface 16, striking it in the region $x^1$; from this point it is again reflected but now strikes the absorbed. surface 18 at the point $x^2$, and is wholly absorbed In general, the design of a prism for a periscope is primarily controlled by the requirements of the periscope, including its acceptance angle and whether or not a ray of light passing through the periscope is angularly deflected or, as is more usually the case, the incident and emergent rays are parallel. For the purposes of the invention, the greater the ratio of length to transverse widths of the prism, the easier it is to arrange that unwanted internal reflections within the prism are absorbed.

The prism can be made from a variety of optical materials, including methyl or other acrylates or mixtures thereof, and glass, glass has certain advantages and is the most widely used material for periscope prisms, but when used in fighting vehicles it is usually required that the periscope should employ two separate optical elements, with an air space between them, to avoid certain disadvantages of the mechanical properties of glass. The invention can be applied to periscopes using multiple elements, and a periscope using two elements is shown in FIG. 2.

The design of a periscope using multiple elements is essentially the same as that for the single element but the design is complicated by the fact that reflections can occur from each optical surface of the elements including the surfaces defining the air gap.

Referring to Figure 2, the casing 30 accommodates two elements 31 and 32 and has a mounting flange 33. The elements 31 and 32 are mounted with an air space between them; this space will normally be sealed and filled with dry gas. Element 31 has a front working surface 34, an internally reflecting surface 35 and an exit surface 36 and nonreflecting and absorbing surfaces 37, 38, and 39. Element 32 has an entry surface 41, parallel to surface 36, a reflecting surface 42 and an exit surface 43. It has also absorbing surfaces 44, 45 and 46.

The surfaces 34, 35, 36, 41, 42, and 43 are all polished and the angular disposition of these surfaces is such that external light entering the periscope does not become reflected from these surfaces and returned to the zone embraced by the limiting rays R1 and R2.

It is important that the surfaces 36 and 41 should be inclined to the path of the median ray through the prism; if these surfaces are arranged at right angles to the path of the median ray, internal reflection from the surfaces will be sufficient to cause substantial reflection of a powerful ray incident on the front surface of the prism. By inclining the surface 36 as shown in FIG. 2, a pencil of rays entering the front surface 34 of the prism at slightly beyond the angle of the limiting ray R2, along the path $x$, will strike the internally reflecting surface 35, and will be reflected as shown to the position $x^1$ on surface 36. It is then reflected on to surface 35 and back on to the absorbing surface 39 at point $x^2$. If the surfaces 36 and 41 are parallel, as is usually the case, similar considerations apply to surface 41; if not, surface 41 has to be considered separately, in the same general way.

The periscope shown in FIG. 2 has been found very satisfactory in practice, and data concerning its construction are given in table I.

TABLE I

Glass: Refractive Index = 1.523

| Surface | Length (Inches) | Angle between Surfaces | Degrees |
|---|---|---|---|
| 34 | 2.18 | 34–39 | 180 |
| 39 | 2.42 | 39–36 | 127 |
| 36 | 1.77 | 36–37 | 64 |
| 37 | 3.03 | 37–35 | 141 |
| 35 | 2.6 | 35–38 | 145 |
| 38 | 0.9 | 38–34 | 63 |
| 43 | 1.97 | 43–46 | 180 |
| 46 | 0.5 | 46–41 | 127 |
| 41 | 1.66 | 41–45 | 64 |
| 45 | 1.28 | 45–42 | 101 |
| 42 | 1.9 | 42–44 | 160 |
| 44 | 0.9 | 44–43 | 48 |

It will be understood that the data given in table I is by way of example only, and that many other forms of prisms can be constructed in accordance with the invention, to avoid undesirable reflections. For example, more than two internally reflecting surfaces can be provided if desired.

What is claimed is:

1. A periscope for observing an object comprising prism means adapted to pass light beams within the confines of two limiting light rays which define an acceptance angle for said periscope having a generally horizontal median and to prevent reflection of light back to said object, said prism means including an elongated body of transparent material defined by a plurality of contiguous, angularly related surfaces relatively arranged to define said acceptance angle and of a size not substantially greater than that necessary to accommodate rays within said acceptance angle, said surfaces including generally parallel side wall surfaces, a planar entry surface adjacent one end of said body for passing light incident thereon into said prism. Two substantially parallel internally reflecting surfaces positioned to transmit light within said prism means from said entry surface to said exit surface, said reflecting surfaces being inclined so that light incident on said entry surface within said acceptance angle makes an angle other than a right angle with said reflecting surfaces, said exit surface being inclined with respect to said reflecting surfaces so that beams of light incident on said exit surface and derived from light incident on said entry surface within said acceptance angle after reflection by said reflection surfaces make an angle other than a right angle with said exit surface, and a plurality of light absorbing surface means on said side wall surfaces extending between said entry, exit and reflecting surfaces, said absorbing surface means being angularly arranged relative said entry, exit and reflecting surfaces to prevent light reflected therefrom from emerging from aid entry surface in a direction which lies along or above the horizontal and to receive light rays therefrom outside the angle of acceptance, and a protective casing means for supporting said prism means with said entry surface of said body fully exposed over a major portion of the working range thereof and inclined forwardly to the vertical at its upper edge at an acute angle within the range of from 10° to 40° to form an angle other than a right angle between the entry surface and the median of said acceptance angle.

2. The periscope of claim 1 wherein said body includes first and second body sections, the first body section including a light output surface and said second body section having a light input surface, said light output surface being in adjacent spaced relationship and parallel to said light input surface and input surfaces being angled at other than a right angle with respect to the median ray of said acceptance angle passing through said output and input surfaces.

* * * * *